Oct. 24, 1967  N. J. TRBOJEVICH  3,349,002
NUCLEAR REACTOR
Filed March 28, 1958
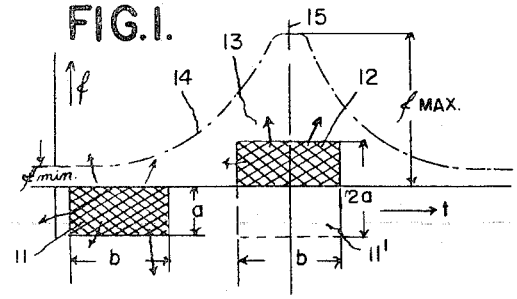
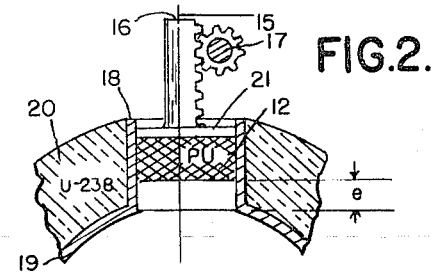
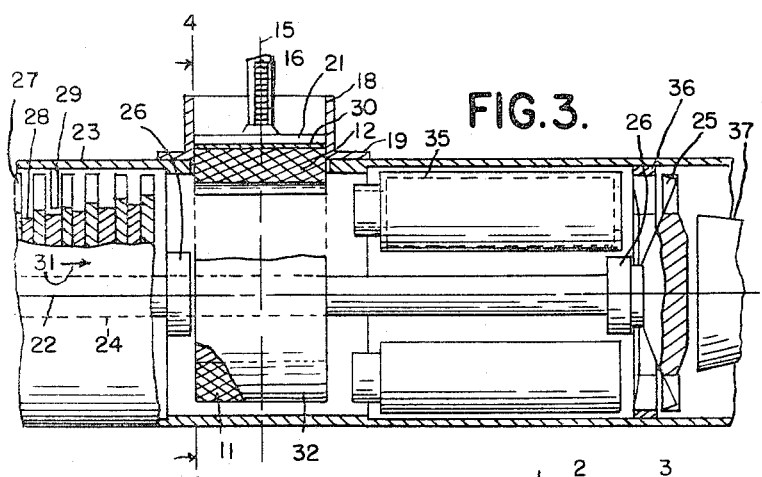
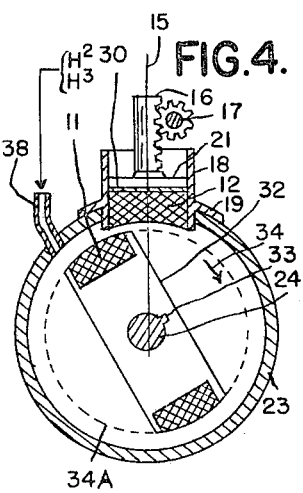
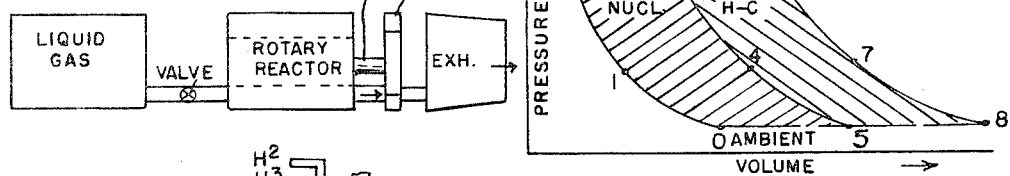
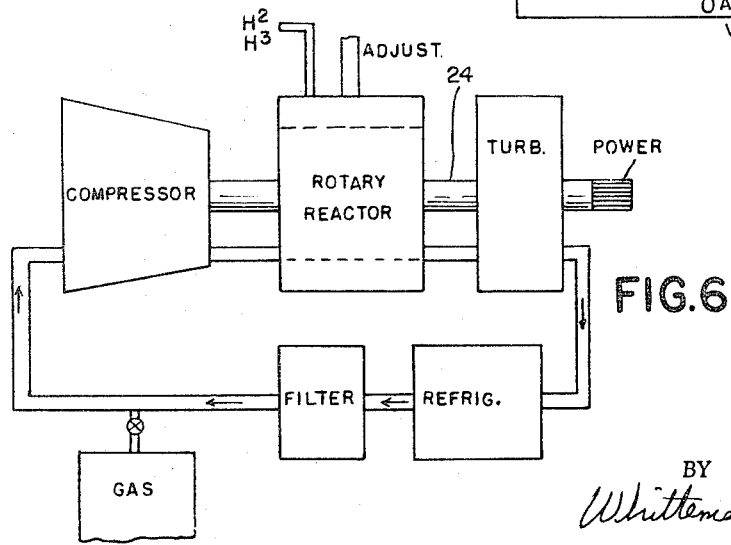
*INVENTOR.*
NIKOLA J. TRBOJEVICH
BY Whittemore, Hulbert & Belknap
ATTORNEYS United States Patent Office 3,349,002
Patented Oct. 24, 1967

3,349,002
NUCLEAR REACTOR
Nikola J. Trbojevich, 8106 E. Jefferson Ave.,
Detroit, Mich. 48214
Filed Mar. 28, 1958, Ser. No. 724,713
4 Claims. (Cl. 176—21)

The invention relates to an improvement in nuclear reactors which may be used in the propulsion of aircraft, rockets and vehicles, for breeding and the like.

The novelty resides in the construction of a rotary and fast reactor in which the energy is produced in a series of discontinuous pulses, instead of continuously as in prior designs. In order to accomplish this, the new reactor comprises a rotor and a stator in which the fuel elements are distributed in a plurality of discrete lumps or pads along the adjoining circumferences of the said rotor and stator.

The arrangement is such that whenever, as a result of rotation, two such lumps arrive in a juxtaposite position, a momentary chain process is established resulting in what might be called an intense nuclear spark. The said spark is promptly extinguished afterwards and the said fuel lumps are cooled and scavenged by means of a copious supply of compressed air or gas.

The object is to produce a momentary neutron and power pulse of the greatest possible intensity and that, without a damage to the fuel elements and the adjoining mechanism.

Another object is to construct a nuclear turbojet upon this principle.

Another object is to construct a combination in which a turbojet may be actuated either by a nuclear or a conventional fuel, together or separately.

Another object is to construct a turbojet or rocket which does not require oxygen or ordinary fuel for its operation.

A further object is to devise a compact mechanism comprising a compressor, a reactor and a turbine in which all three elements are mounted in the same tube and are rotatable by means of a single shaft.

Another object is to provide for the regulation or discontinuation of the nuclear fission by means of the withdrawal of the elements in the stator.

In the broad sense, the object is to construct a rotary reactor in which the momentary output is a function of the angular displacement of the rotor with respect to the stator and the duration of each pulse is dependent upon the angular velocity of the rotor. By this means the output is controlled in a relatively simple manner.

In the drawings:

FIGURE 1 is a geometrical diagram explanatory of the theory of the new reactor.

FIGURE 2 is a portion of the stator showing the means for adjustment and the disposition of the fertile material needed for breeding.

FIGURE 3 is a longitudinal cross section of the new nuclear turbojet operable by a combination of nuclear and conventional fuels.

FIGURE 4 is the section taken in the plane 4—4 of FIGURE 3.

FIGURE 5 is an indicator diagram of the Brayton cycles used in the turbojet.

FIGURE 6 is a schematic representation of a closed cycle modification.

FIGURE 7 is another modification diagrammatically representing the cycle used for the propulsion of rockets and missiles.

The theory will be first explained.

In FIGURE 1 two highly enriched fissionable masses 11 and 12 are shown and indicated by cross-hatching. The first said mass 11 is attached to a high-speed rotor and moves *tangentially* with respect to a similar mass 12 affixed to the stator.

In the coordinate diagram the abscissa is taken as the time $t$ while the ordinate is the neutron flux $f$.

The said two masses, which are taken to be two similar parallelepipeds for simplicity are so selected that each parallelepiped is subcritical per se, but when they unite in a single parallelepiped 12 and 11', the latter position being indicated by the dotted lines in the axis 15 of the diagram, they become critical and generate a divergent chain process. The criticality is obtained by reducing the circumference of the combined cross section of the parallelepipeds from $4a+4b$ to $4a+2b$, as indicated in the diagram. The difference of $2b$ in the combined cross sections is selected to be just sufficient to raise the flux in the axis 15 to a predetermined value of $f$ max. In the flux curve 14 the residual or minimum flux is indicated by the symbol $f$ min.

It is to be noted that this process is somewhat similar to the well known process which is or was used for setting off atom bombs, except that the divergent chain process is now extinguished practically as soon as it is started, i.e., usually within $10^{-5}$ sec.

The arrows 13 indicate the escaping neutrons from the cross section $ab$ of the parallelepipeds.

In FIGURE 2 a portion of the stator is diagrammatically shown. The fissionable mass 12, also marked with PU (meaning plutonium) is longitudinally translated along the axis 15 by means of a rack 16, plate 21 and pinion 17. The object is to increase the width of the gap $e$ for the purpose of discontinuing the chain process when so required. The said mass 12 is guided in a thin walled holding member 18 which also supports a considerable mass 20 of fertile material marked U–238 (uranium) at its outer circumference for the purpose of breeding. In airplanes and rockets I usually omit the said fertile material in order to reduce the weight of the apparatus and relegate the operation of breeding the required concentrated nuclear fuel to suitable ground installations.

In FIGURES 3 and 4 a complete nuclear turbojet apparatus is partly diagrammatically shown. The novelty resides in the design of the reactor and the method of operation wherefore the remaining elements, being well known, will only be briefly described.

As is seen in FIGURE 3, the apparatus is built along two mutually perpendicular and intersecting axes, viz, the horizontal axis 22 which is also the axis of the outer tube 23, the drive shaft 24, two bearings 26 and the turbine wheel 25, the latter being integrally formed with the said shaft 24 and the perpendicular axis 15 which serves as the main axis of the reactor and as such is coaxial with the elevating rack 16, the plate 21, the bond 30, the fuel pad 12, the hollow rectangular insert and holder 18 and its integrally formed extensions 19. The said holder 18 is affixed to the outer tube 23 in a suitable rectangular aperture formed in the wall of the latter by riveting or welding the said two elements together.

The ambient air enters the device at the left end of

FIGURE 3, as shown by the arrow 31, and is first slowed down, then compressed, then heated, expanded in the turbine and finally, accelerated through the exhaust, i.e., the operation exactly corresponds to the well known Brayton cycle (see also FIGURE 4), which is used in ordinary turbojets.

The compressor comprises a rotor keyed to the shaft 24, the said rotor consisting of a plurality of bladed disks 27 and intervening spacers 28. The stator is affixed to the outer tube 23 and comprises a plurality of bladed rings, each having a plurality of blades 29 adapted to occupy the spacings provided by the said spacer disks 28. Only one blade 29 is shown in the drawing, for clarity. It is further to be noted that the stator rings are split each in two halves in order that they may be assembled over the rotor.

The design of the new reactor having a vertical axis 15 will be readily understood from FIGURE 4. The rotor 32 is mounted upon the shaft 24, is secured in position by means of the key 33 and rotates in the direction of the arrow 34 in unison with the rotor of the compressor 27 and turbine 25. The said rotor usually has the form of a flat and exactly balanced slab capable of housing two similar fissionable masses 11 at its two ends where it is bounded by the cylinder 34A. The adjustment of the outer fissionable mass 12 by means of a rack 16 and pinion 17 was already explained in connection with FIGURE 2 while the flux curve 14 generated by the reactor was similarly shown in connection with FIGURE 1.

Adjacent to the reactor are two oil burner tubes 35. These may be of an entirely conventional design and need not be explained here in detail. However their purpose and role in the makeup of this invention is significant. I conceived the idea of a light and powerful source of nuclear energy for the propulsion of aircraft which could be constructed providing that the fission products could be blown out into the ambient air in their nascent state, as already mentioned in the preamble. Hence, the exhaust gases are radioactive and ionized. Therefore, the reactor cannot be very well operated until the plane has ascended to a safe distance away from the airfield. For this reason, this turbojet is designed to operate both on conventional and nuclear fuels.

The turbine 25 is preceded by a stationary diffuser 36. The end cone 37 is used for the purpose or gradually increasing the effective cross section of the tailpipe and thus provides an orderly expansion of the gases issuing from the said turbine.

The tube 38 in FIGURE 4 serves for the injection into the reactor of neutron-rich light isotopes such as deuterium ($H^2$) or tritium ($H^3$) for the purpose of boosting the power by increasing the number of fissions. In this method it is possible to do so because of the much higher peaks of the flux curve 14, FIGURE 1, obtainable in this reactor than could be obtained in the conventional or steady-flow reactors.

In FIGURE 5 an indicator diagram characteristic of the operation of the jet engine above described is shown. The diagram is of the Brayton type as already stated and corresponds to the dual drive shown in FIGURE 3, i.e., the incoming air can be heated either by nuclei or by hydrocarbons or by both. Thus, in the *pv* diagram, the first cycle relating to the nuclear modification and marked NUCL starts from the point 0 having first an adiabatic compression 0–1, the ram effect, and 1–2, the rise in the compressor. The horizontal line 2–3 indicates heat induction into the reactor, the said heat quantity adding to the volume and velocity of the gases but not to their pressure. From the points 3 to 4, the turbine adiabatically expands the gases just sufficiently to produce enough torque to operate the compressor and the reactor and no more. From the points 4 to 5, the gas expands through the exhaust tube down to the ambient and thus provides the jet needed for the propulsion of the craft.

The hydrocarbon cycle marked H–C runs through the points 5 3 6 7 8 and is quite similar to the one just described. The area of the combination of the two diagrams 0 2 6 8 represents the maximum power which the apparatus is capable of furnishing.

In FIGURE 6 a schematic diagram shows, as a modification, the application of the new reactor in a closed cycle. The advantage of the closed cycle resides in the fact that there is no radioactive gas issuing from the turbine into the exhaust. For this reason, the modification is suitable for the purposes of breeding, for power production, for submarines, etc. The elements in the cycle, FIGURE 6, are all so clearly marked that they will be clearly understood and no further explanation will be necessary.

In FIGURE 7, a very simple arrangement is shown according to which rockets and missiles may be propelled by means of nuclear power through empty space.

It should be noted in this connection that rockets are driven on the principle of equipartition of momenta and inasmuch as the momentum is the product of mass and velocity, it follows that energy alone is insufficient to propel a rocket in an empty space. In FIGURE 7 the matter to be backwardly ejected from the rocket is carried in the tank marked "Liquid Gas." A too rapid expansion of this gas is prevented by means of a rotating turbine wheel which also furnished the required power to the rotor of the reactor while the latter furnishes the heat energy required for the acceleration of the gas and the power lost in the turbine.

What I claim as my invention is:

1. A reactor comprising a cylindrical core rotatable about an axis, an outer stationary member tangential of the said core and two fissionable and subcritical masses respectively affixed to the said core and member and so selected that when the first said mass tangentially bypasses the second said mass in its proximity, the combined masses become momentarily hypercritical and momentarily generate a divergent fission chain reaction and in which the mass in the outer member comprises a slide and means for bodily moving the said mass in the said slide in a direction perpendicular to the said axis, for the purpose of adjustment.

2. A reactor comprising a cylindrical core rotatable about an axis, a hollow cylindrical member enveloping the said core, a plurality of fissionable masses discretely distributed along the adjoining circumferences of the said core and member, and means for moving the masses in the said enveloping member in a direction perpendicular to the said axis.

3. In a reactor, a combination of a rotor with a stator in which the said two members comprise a plurality of discrete fissionable units, in which the units in the said stator are outwardly retracted to provide a clearance, in which the stator is provided with means for injecting into the rotor additional neutron-rich material of the class consisting of deuterium and tritium and in which the speed of rotation of the said rotor is predetermined to produce a series of neutron pulses of the required magnitude and frequency.

4. A reactor according to claim 3 in which the units are over fifty percent enriched and require no moderator for their proper functioning.

References Cited

UNITED STATES PATENTS 2,812,304  11/1957  Wheeler _____ 204—193.2

FOREIGN PATENTS 1,137,047  1/1957  France.
1,007,442  5/1957  Germany.
614,386  12/1948  Great Britain.

(Other references on following page)

OTHER REFERENCES

Glastone, Principles of Nuclear Reactor Engineering, D. van Nostrand Co., Inc., New York (1955), pp. 29, 36 and 738.

Murray II, Nuclear Reactor Physics, 1957, p. 5, Prentice-Hall, Englewood Cliffs, N.J.

Murray I, Introduction to Nuclear Engineering, 1954, pp. 96–99 and 349–366, Prentice-Hall, New York, N.Y.

"Aircraft Nuclear Propulsion Program," U.S. Government Printing Office, July 23, 1959, p. 361.

REUBEN EPSTEIN, *Primary Examiner.*

ROGER L. CAMPBELL, LEON D. ROSDOL,
*Examiners.*

H. H. BRADLEY, S. F. STONE, R. C. LYNE,
*Assistant Examiners.*